US010447996B2

(12) United States Patent
Ikenoue et al.

(10) Patent No.: US 10,447,996 B2
(45) Date of Patent: Oct. 15, 2019

(54) INFORMATION PROCESSING DEVICE AND POSITION INFORMATION ACQUISITION METHOD

(71) Applicant: Sony Interactive Entertainment Inc., Tokyo (JP)

(72) Inventors: Shoichi Ikenoue, Chiba (JP); Yoshihiko Suwa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 34 days.

(21) Appl. No.: 15/754,778

(22) PCT Filed: Sep. 26, 2016

(86) PCT No.: PCT/JP2016/078161
§ 371 (c)(1),
(2) Date: Feb. 23, 2018

(87) PCT Pub. No.: WO2017/057218
PCT Pub. Date: Apr. 6, 2017

(65) Prior Publication Data
US 2018/0288400 A1    Oct. 4, 2018

(30) Foreign Application Priority Data

Oct. 1, 2015 (JP) .................................. 2015-196219

(51) Int. Cl.
*H04N 7/18* (2006.01)
*H04N 13/246* (2018.01)
(Continued)

(52) U.S. Cl.
CPC ........... *H04N 13/246* (2018.05); *G01B 11/00* (2013.01); *G01C 3/06* (2013.01); *G01C 3/085* (2013.01);
(Continued)

(58) Field of Classification Search
CPC ... G06T 7/85; G06T 2207/10012; G06T 1/00; G06T 2207/30201; G01C 3/085;
(Continued)

(56) References Cited

U.S. PATENT DOCUMENTS 7,620,206 B2 * 11/2009 Ohba ...................... G06F 3/012
                                                                            382/103
8,120,644 B2    2/2012 Chen
(Continued)

FOREIGN PATENT DOCUMENTS

CN    102792333 A    11/2012
CN    103581642 A    2/2014
(Continued)

OTHER PUBLICATIONS

Extended European Search Report for corresponding EP Application No. 16851389.3, 8 pages, dated Feb. 1, 2019.
(Continued)

*Primary Examiner* — Sathyanaraya V Perungavoor
*Assistant Examiner* — Peet Dhillon
(74) *Attorney, Agent, or Firm* — Matthew B. Dernier, Esq.

(57) ABSTRACT

When a device is started up in the first time, for example, an initial image and various kinds of information are displayed and setting inputs are received. In parallel with the above, a photographed image is acquired and calibration is performed. At this time, first, if there is no need for measures by a user such as a direction of a camera is corrected, the calibration is performed. If the measures by the user are needed or the calibration is ended unsuccessfully, the stage number n is advanced by one, and the calibration is repeated while presenting information on the measures in the order of a low burden on the user.

11 Claims, 10 Drawing Sheets

(51) Int. Cl.
  *G01C 3/06* (2006.01)
  *G01B 11/00* (2006.01)
  *G06T 1/00* (2006.01)
  *H04N 5/232* (2006.01)
  *G06T 7/80* (2017.01)
  *G01C 3/08* (2006.01)
  *G01C 25/00* (2006.01)
  *G06K 9/00* (2006.01)

(52) U.S. Cl.
  CPC ............... *G01C 25/00* (2013.01); *G06T 1/00* (2013.01); *G06T 7/85* (2017.01); *H04N 5/232* (2013.01); *G06K 9/00228* (2013.01); *G06T 2207/10012* (2013.01); *G06T 2207/30201* (2013.01)

(58) Field of Classification Search
  CPC ........ G01C 25/00; G01C 3/06; H04N 13/246; H04N 5/232; G01B 11/00; G06K 9/00228
  See application file for complete search history.

(56) References Cited

U.S. PATENT DOCUMENTS

| | | | |
|---|---|---|---|
| 8,179,448 B2 | 5/2012 | Chen | |
| 8,878,776 B2 | 11/2014 | Takahashi | |
| 8,917,929 B2 | 12/2014 | Ichimori | |
| 9,384,551 B2* | 7/2016 | Ramaswamy | G06T 7/85 |
| 9,866,818 B2 | 1/2018 | Myokan | |
| 2006/0125920 A1 | 6/2006 | Criminisi | |
| 2011/0311130 A1 | 12/2011 | Ichimori | |
| 2012/0062454 A1 | 3/2012 | Takahashi | |
| 2012/0098828 A1* | 4/2012 | Ogata | H04N 13/128 345/419 |
| 2014/0043447 A1 | 2/2014 | Huang | |
| 2014/0125772 A1 | 5/2014 | Myokan | |
| 2015/0077520 A1 | 3/2015 | Ohba | |
| 2016/0191784 A1 | 6/2016 | Murayama | |

FOREIGN PATENT DOCUMENTS

| | | |
|---|---|---|
| CN | 103813151 A | 5/2014 |
| CN | 104380338 A | 2/2015 |
| EP | 0999518 A1 | 5/2000 |
| JP | 2006170993 A | 6/2006 |
| JP | 2012063876 A | 3/2012 |
| WO | 2013175700 A1 | 11/2013 |
| WO | 2015020038 A1 | 2/2015 |

OTHER PUBLICATIONS

M Pouefeys: "3D from Image Sequences: Calibration. Motion and Shape Recovery" in: "Handbook of Mathematical Models in Computer Vision," Chapter 24, pp. 389-403, Jan. 1, 2006.

International Preliminary Report on Patentability and Written Opinion for corresponding PCT Application No. PCT/JP2016/078161, 11 pages, dated Apr. 12, 2018.

International Search Report for corresponding PCT Application No. PCT/JP2016/078161, 4 pages, dated Dec. 6, 2016.

The first office action for corresponding CN Application No. 2016800554283, 18 pages, dated Jul. 3, 2019.

* cited by examiner

FIG.7
(a)
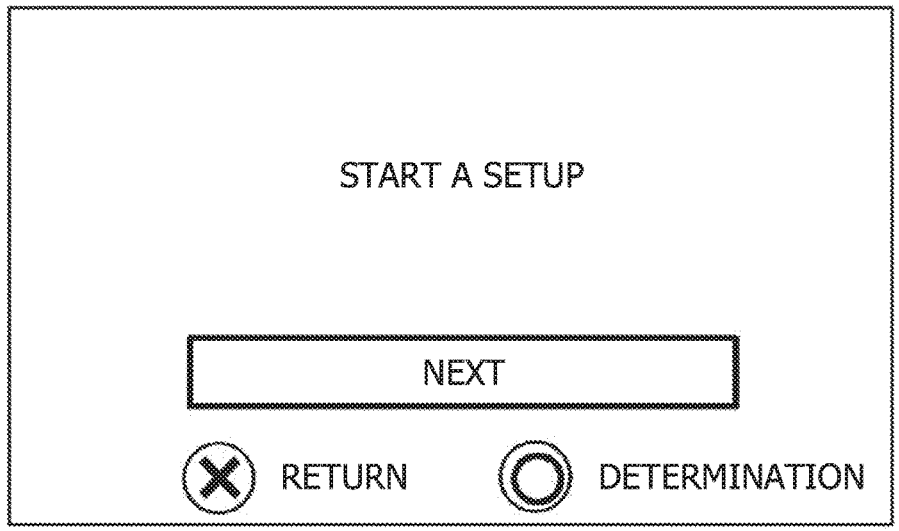
(b)
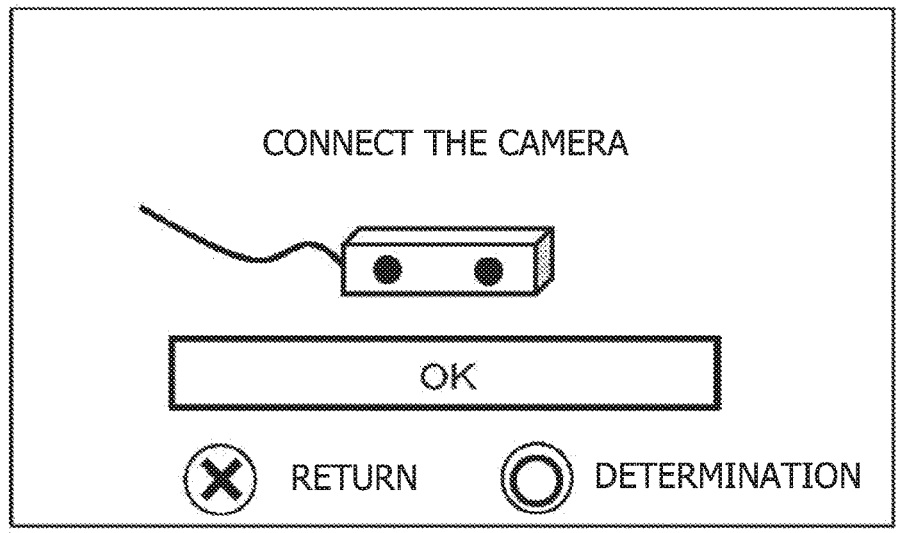

INFORMATION PROCESSING DEVICE AND POSITION INFORMATION ACQUISITION METHOD

TECHNICAL FIELD

The present invention relates to an information processing technology accompanied by detection of an object in a photographed image.

BACKGROUND ART

A game is known in which a body of a user or a marker is photographed by a camera and an area of its image is replaced by another image to display the image on a display (see, for example, PTL 1). Also, a user interface system that receives movements of a mouth or hands photographed by a camera as an operation instruction of applications is known. In this way, a technique for photographing a real world, displaying a virtual world responsive to its movements, and performing some sort of information processing has been used in a wide range of fields from mobile terminals to leisure facilities, regardless of its scale.

CITATION LIST

Patent Literature

[PTL 1] European Published Patent No. 0999518 A1

SUMMARY

Technical Problem

In the above-mentioned technology, how information on the real world from the photographed image is acquired accurately and quickly is always an important problem. Therefore, it is important that basic features such as an optical axis deviation of a camera are previously acquired and the features are added at the time of operation to perform an image analysis. However, when the camera is used in a general household, a photographing environment is various in particular and, as an accuracy of a feature acquisition is more pursued, a burden on a user for adjusting the photographing environment increases more. As a result of starting to use a device in insufficient preparation by the user that feels annoyed with such a previous procedure, an original performance of the device cannot be exerted and deteriorated user experiences may be generated.

In view of the foregoing, it is an object of the present invention to provide a technology for reducing a burden on the user according to the feature acquisition of the camera in the device that acquires position information on the object on the basis of the photographed image.

Solution to Problem

One mode of the present invention relates to an information processing device. This information processing device is an information processing device that acquires position information on an object from an image photographed by a stereo camera and performs information processing, including: a calibration unit configured to detect corresponding points from stereo images photographed from view points of left and right by the stereo camera and thereby perform calibration of the stereo camera; and a position information acquisition unit configured to correct the stereo images obtained by photographing a moving picture of the object by the stereo camera and further detect the corresponding points to thereby derive a parallax on the basis of a result of the calibration, and acquire and output the position information on the object on the basis of the parallax, in which the calibration unit repeats stepwise processing for presenting prescribed information and retrying the calibration in the order that is set on the basis of a low burden on a user in accordance with an unsuccess of the calibration and ends an operation in a stage in which the calibration is successful.

Another mode of the present invention relates to a position information acquisition method. This position information acquisition method is a position information acquisition method performed by an information processing device that acquires position information on an object from an image photographed by a stereo camera and performs information processing, including: a step of detecting corresponding points from stereo images photographed from view points of left and right by the stereo camera and thereby performing calibration of the stereo camera; and a step of correcting the stereo images obtained by photographing a moving picture of the object by the stereo camera and further detecting the corresponding points to thereby derive a parallax on the basis of a result of the calibration, and acquiring and outputting the position information on the object on the basis of the parallax, in which the step of performing the calibration repeats stepwise processing for presenting prescribed information and retrying the calibration in the order that is set on the basis of a low burden on a user in accordance with an unsuccess of the calibration and ends an operation in a stage in which the calibration is successful.

In addition, an arbitrary combination of the above components and expressions of the present invention obtained by converting those among methods, devices, systems, computer programs, recording mediums in which the computer programs are recorded, or the like are also effective in the modes of the present invention.

Advantageous Effect of Invention

In accordance with the present invention, in a position information acquisition technology using the photographed image, a burden on the user can be reduced.

BRIEF DESCRIPTION OF DRAWINGS

FIG. 7 is a diagram illustrating an example of a screen displayed in S12 and S14 of FIG. 6.

DESCRIPTION OF EMBODIMENT

Figure 1:
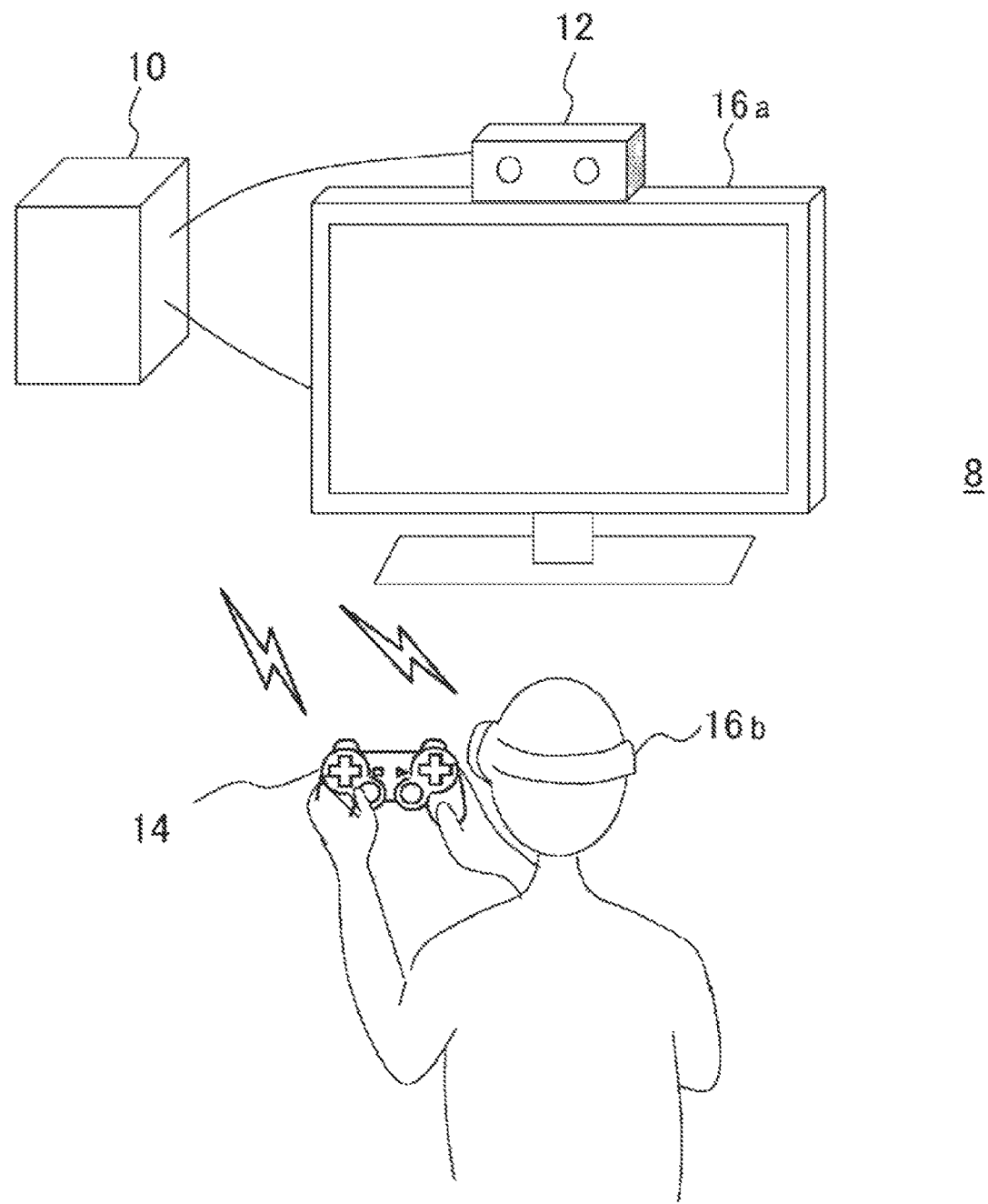
FIG. 1 is a diagram illustrating a configuration example of an information processing system to which the present embodiment is applicable.

FIG. 1 illustrates a configuration example of an information processing system to which the present embodiment is applicable. The information processing system 8 includes an imaging device 12 that photographs an object, an information processing device 10 that performs information processing on the basis of the photographed image, a flat display 16a and head-mounted display (hereinafter, referred to as an "HMD") 16b that display the image obtained as a result of the information processing, and an input device 14 operated by a user.

The information processing device 10 may be connected to the imaging device 12, the input device 14, the flat display 16a, and the HMD 16b by using a wireline cable or well-known wireless communication technology such as Bluetooth (registered trademark). Further, the input device 14, the flat display 16a, or the HMD 16b may be introduced selectively depending on the information processing performed by the information processing device 10. Further, appearance shapes of these devices are not limited to those illustrated in the figures. Further, a device including two or more devices of these devices integrally may be used. For example, the information processing device 10, the input device 14, and the flat display 16a may be realized by using a mobile terminal or the like including them.

The imaging device 12 has a camera that photographs an object such as the user at a prescribed frame rate, and a mechanism that generates output data as the photographed image by subjecting the output signals to general processing such as demosaic processing from the camera and sends the output data to the information processing device 10. The camera is a stereo camera in which general visible light sensors are disposed in the left and right at a well-known interval, such as a CCD (Charge Coupled Device) sensor or a CMOS (Complementary Metal Oxide Semiconductor) sensor.

The information processing device 10 performs necessary information processing by using data transmitted from the imaging device 12 and generates output data such as images or voices. Herein, contents of the processing performed by the information processing device 10 are not particularly limited and may be appropriately determined in accordance with a function or contents etc. of applications requested by the user. For example, the photographed images are subjected to tracking processing, and thereby a game is progressed in which a character appears on which movements of the user as the object are reflected, or the movements of the user are converted into a command input to perform the information processing.

At this time, operations of the input device 14 may be acquired by using a marker installed at the input device 14. By tracking a plurality of markers installed at an external surface of the HMD 16b, a position of a head or attitude of the user that wears the HMD 16b may be specified and the HMD 16b may be allowed to display a virtual world viewed from view points moving in accordance with the head or attitude. The output data generated by the information processing device 10 is transmitted to at least one of the flat display 16a and the HMD 16b.

The flat display 16a may be a television set having a display that outputs a two-dimensional image and a speaker that outputs voices and may be, for example, a liquid crystal television, an organic EL (Electroluminescence) television, a plasma television, a PC (Personal Computer) display, or the like. Alternatively, the flat display 16a may be a display and a speaker of a tablet terminal or a mobile terminal. The HMD 16b is a display device that is worn on the head by the user and thereby that displays an image on a display panel such as an organic EL panel located in front of eyes of the user. In the HMD 16b, for example, a parallax image viewed from view points of the left and right may be generated and displayed on areas of the left and right obtained by dividing the display screen into two, respectively, thereby providing a stereoscopic view of the image.

Note, however, that the present embodiment is not the gist limited to the above-described example and one image may be displayed on the entire display screen. The HMD 16b may further house a speaker or earphone that outputs voices to a position according to ears of the user. In addition, in subsequent descriptions, the flat display 16a and the HMD 16b may be collectively referred to as the display device 16. The input device 14 is operated by the user, and thereby receives commands such as a start or end of processing, a selection of the function, or an input of various commands and supplies the commands to the information processing device 10 as electrical signals.

The input device 14 may be realized by any of general input devices or in combination thereof such as a touch pad installed on the display screen of a game controller, a keyboard, a mouse, a joy-stick, or the flat display 16a. The input device 14 may further include a light-emitting marker including elements that emit light in a prescribed color or an assembly thereof. In this case, the information processing device 10 tracks movements of the marker by using the photographed image, and thereby the operations of the input device 14 itself can be performed as the user operation. In addition, the input device 14 may be configured of only the light-emitting marker and a mechanism that grips the light-emitting marker.

Figure 2:
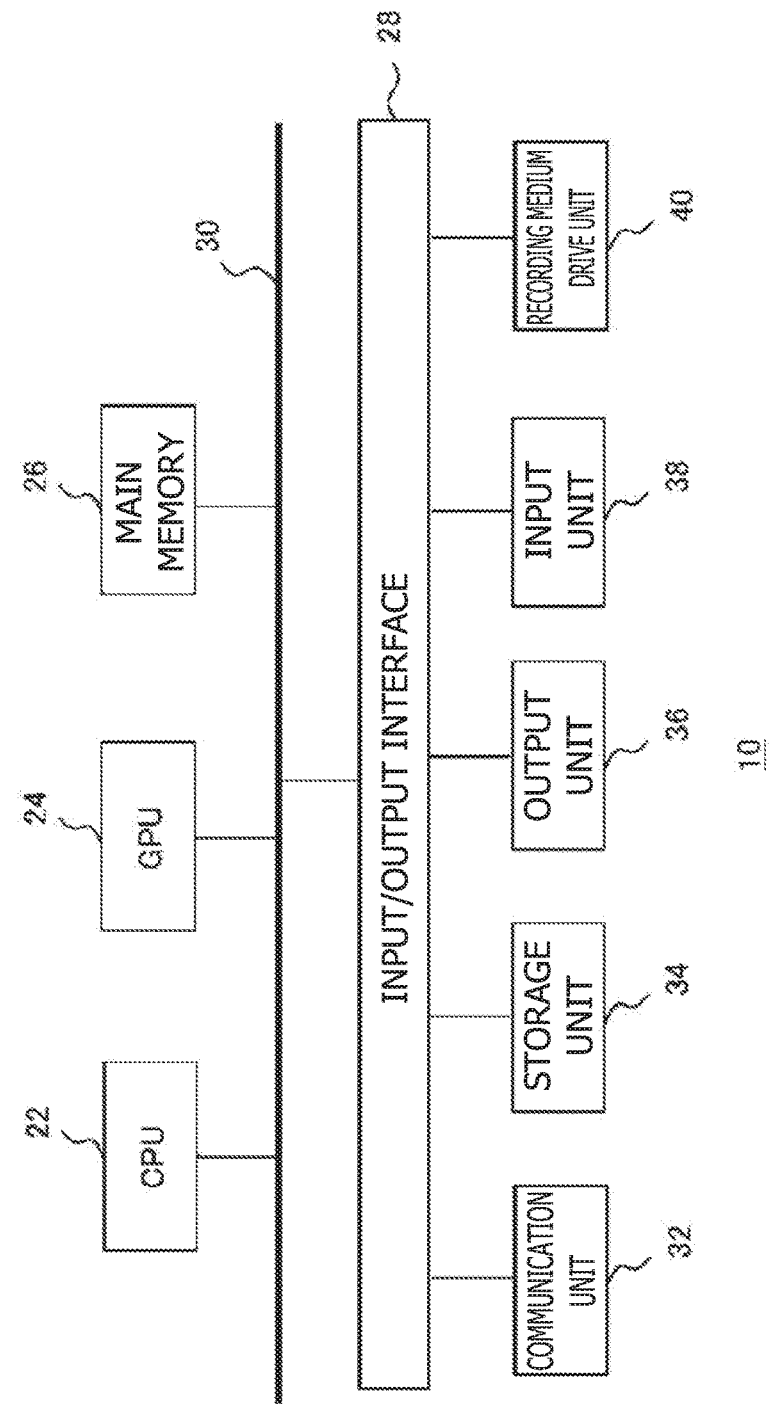
FIG. 2 is a diagram illustrating an internal circuit configuration of an information processing device in the present embodiment.

FIG. 2 illustrates an internal circuit configuration of the information processing device 10. The information processing device 10 includes a CPU (Central Processing Unit) 22, a GPU (Graphics Processing Unit) 24, and a main memory 26. Each of them is connected to each other via a bus 30. To the bus 30, an input/output interface 28 is further connected. To the input/output interface 28, there are connected a peripheral device interface such as a USB (Universal Serial Bus) or IEEE (The Institute of Electrical and Electronics Engineers, Inc.) 1394, a communication unit 32 including network interfaces of a wired or wireless LAN (Local Area Network), a storage unit 34 such as a hard disk drive or nonvolatile memory, an output unit 36 that outputs data to the display device 16, an input unit 38 that inputs data from the imaging device 12 or the input device 14, and a recording medium drive unit 40 that drives a removable recording medium such as a magnetic disk, an optical disk, or a semiconductor memory.

The CPU 22 executes an operating system stored in the storage unit 34 and thereby controls the entire information processing device 10. The CPU 22 further executes various programs read out from the removable recording medium and loaded into the main memory 26 or downloaded via the communication unit 32. The GPU 24 has a function of a geometry engine and a function of a rendering processor; further, the GPU 24 performs drawing processing in accordance with a drawing command from the CPU 22 and stores a display image in a frame buffer (not illustrated). Then, the GPU 24 converts the display image stored in the frame buffer into video signals and outputs the video signals to the output unit 36. The main memory 26 includes RAMs (Random Access Memory) and stores programs or data necessary for processing.

Figure 3:
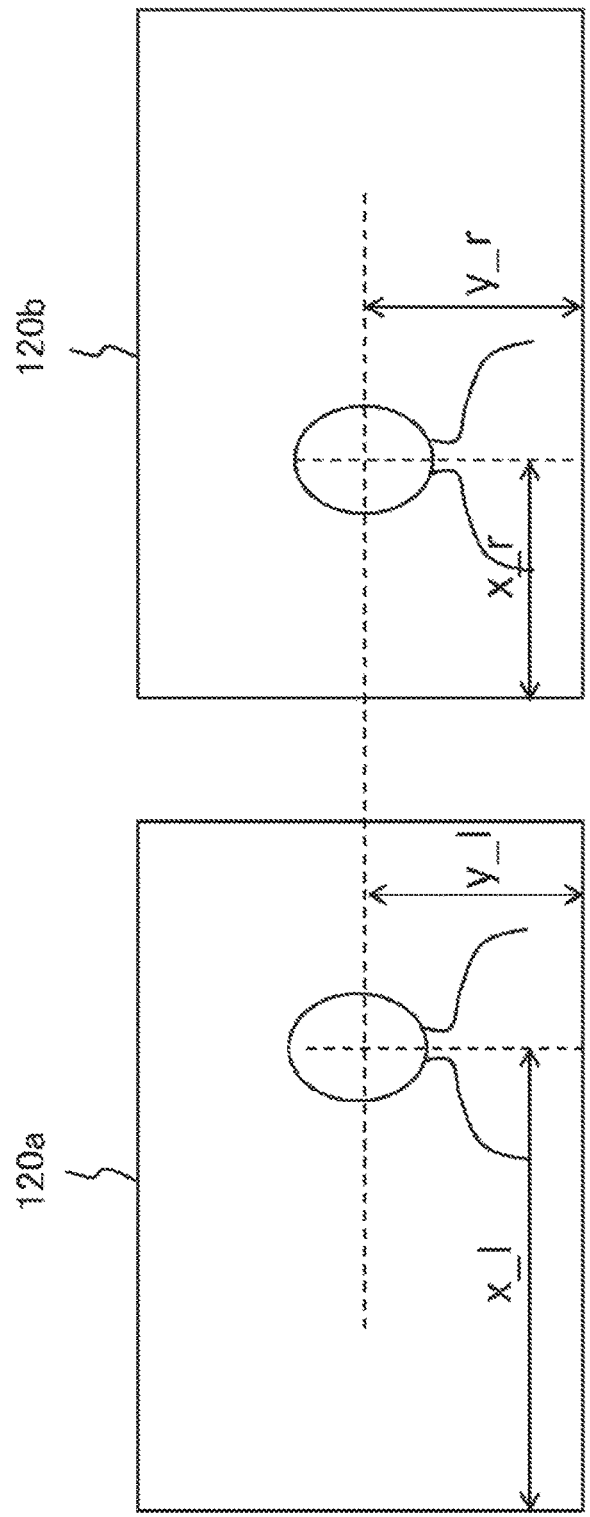
FIG. 3 is a diagram illustrating a method for acquiring a position of an object by using an image photographed by an imaging device in the present embodiment.

FIG. 3 is a diagram illustrating a method for acquiring a position of an object by the information processing device 10 by using the image photographed by the imaging device 12. As described above, the imaging device 12 is configured of the stereo camera in which two cameras are disposed at a well-known interval in the left and right. On a pair of images (stereo images) photographed from left and right view points by the stereo camera, a parallax occurs in a lateral direction of the image depending on the interval of the cameras and a distance of the photographic object from the cameras. In the stereo images 120a and 120b illustrated in the figure, images of the user are reflected to the right in the image 120a from the left view point and to the left in the image 120b from the right view point.

When such an image of the object is detected on the basis of feature points or the like and a difference (for example, x_l-x_r) of position coordinates in the lateral direction of both images is calculated, a distance from an imaging surface to the object can be acquired on the basis of the difference. To a method for calculating the distance from the imaging surface on the basis of the difference of the positions in the lateral direction of the images in the stereo images, a general method based on a principle of triangulation is applicable. Then, on the basis of the calculated distance, the position coordinates of the images of the object in an image plane are reversely projected onto a real space, and thereby the position of the object in the real space can be identified.

When optical axes of two cameras that configure the imaging device 12 are parallel and a positional deviation in the longitudinal direction is not present, the positions (for example, y_l and y_r) in the longitudinal direction of the images of the same object in the stereo images 120a and 120b are matched with each other. When the positions in the longitudinal direction are matched with each other as described above, the feature point of the other image corresponding to the feature point of one image is basically present on a line of the same position, and therefore it is easy to detect the feature point. However, practically, delicate optical axis deviation may occur due to an assembly accuracy or the like.

Figure 4:
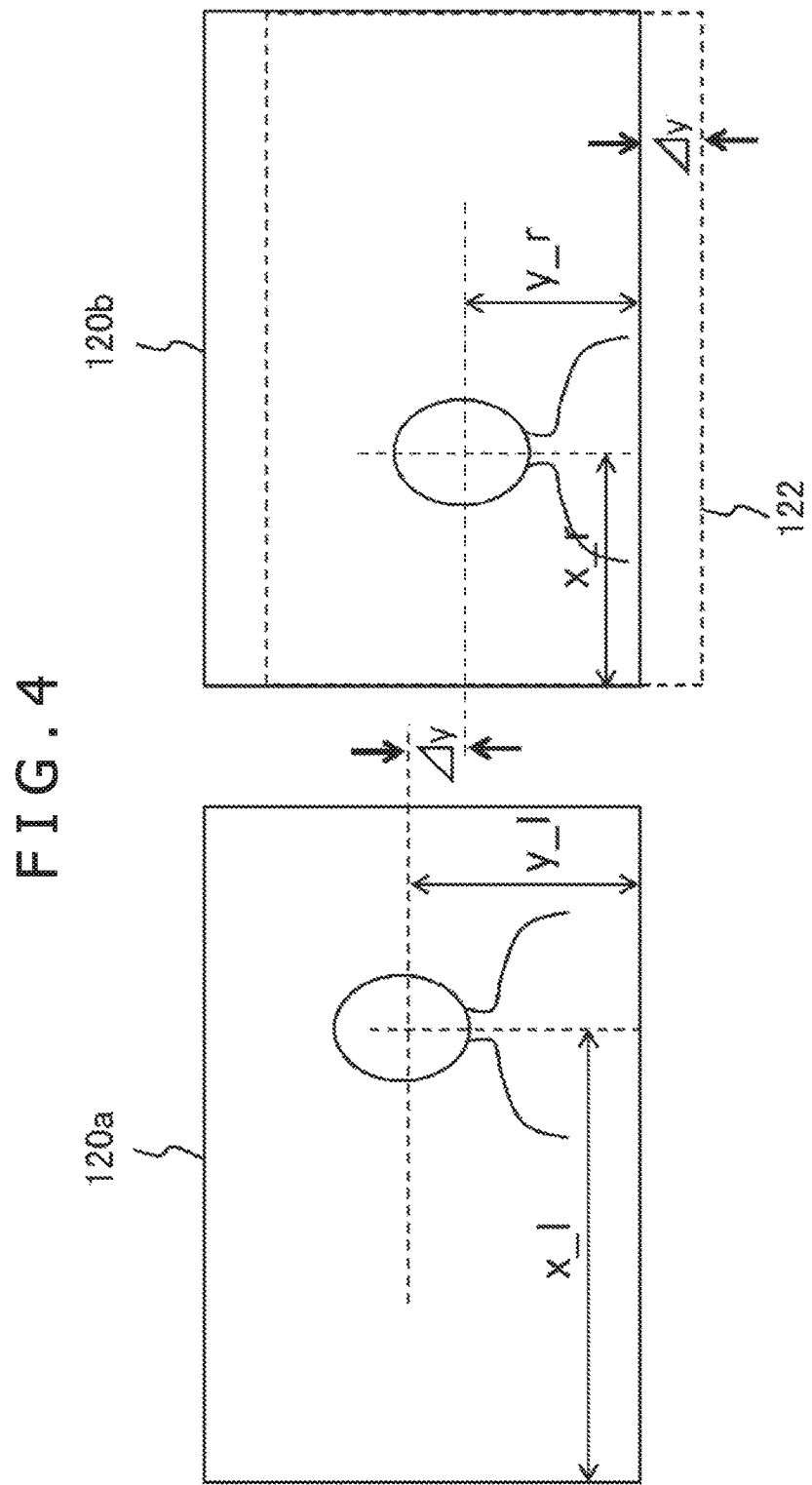
FIG. 4 is a diagram illustrating stereo images at the time when optical axes of cameras of left and right or positions in a longitudinal direction are deviated.

FIG. 4 illustrates the stereo images at the time when the optical axes (in particular, a pitch angle) of the cameras of the left and right or the positions in the longitudinal direction are deviated. In this example, the position (for example, y_l) in the longitudinal direction of the image of the object in the image 120a from the left view point is present by Δy above the position (for example, y_r) of the image corresponding to the image 120b from the right view point. In this state, when the association is performed in accordance with a general rule that the corresponding images are present on the same line of both the images, even if Δy is a difference of about ten pixels, the association may be erroneously recognized. Therefore, an accurate parallax cannot be obtained and finally position acquisition accuracy of the object may not be obtained sufficiently.

For this reason, when a camera calibration is performed previously to acquire a positional deviation Δy in the longitudinal direction, either of the photographed stereo images during the operation is virtually deviated by Δy in the longitudinal direction on the image plane, and then corresponding points are detected, position information can be acquired quickly and accurately. In an example of FIG. 4, the image 120b from the right view point is moved by Δy upwardly and thereby a correction image 122 is generated in which a frame is indicated by a broken line. Then, when the image 120a from the left view point and the correction image 122 are compared with each other, the images of the same object can be easily detected at the same position in the longitudinal direction.

As a value of the positional deviation Δy is calculated more strictly, response or accuracy is more improved in the information processing during the operation; further, it is unknown that the corresponding points are basically present in any positions on the images in the stage of the calibration, and therefore processing of a high burden is needed, such as a wide range in a two-dimensional plane is searched. In order to efficiently and accurately perform the above-described processing, an object in which it is easy to identify the feature point needs to be prepared as a photographic object or a lighting environment needs to be adjusted so as to obtain an image that is easy to analyze. However, cooperation of the user is absolutely needed for this previous preparation and, as the accuracy is more pursued, a burden on the user is more increased.

In the information processing designed for entertainment such as a game, particularly, as such a work increases more, as a result, interests or pleasures of the user may be lost more. Also, a problem occurs that it is difficult to freely use the user such as an infant or aged person that feels the work itself difficult. As a result of omitting a necessary calibration by the user because of bothersome works, the accuracy of position information acquisition drops or the response gets late and the amusement is considered to be ended without acquiring an original performance.

To solve the above-described problems, in the present embodiment, the device determines minimum required measures in accordance with an individual situation and tries the calibration stepwise while displaying information, if necessary, and thereby a burden on the user is reduced as far as possible. In the following descriptions, the positional deviation Δy is assumed to be acquired by the calibration; further, other parameters may be acquired as features of the photographed images or cameras. Further, a method for the calibration is not particularly limited, and a parameter obtained as a result thereof may indicate the positional deviation Δy directly or indicate the positional deviation Δy indirectly.

Figure 5:
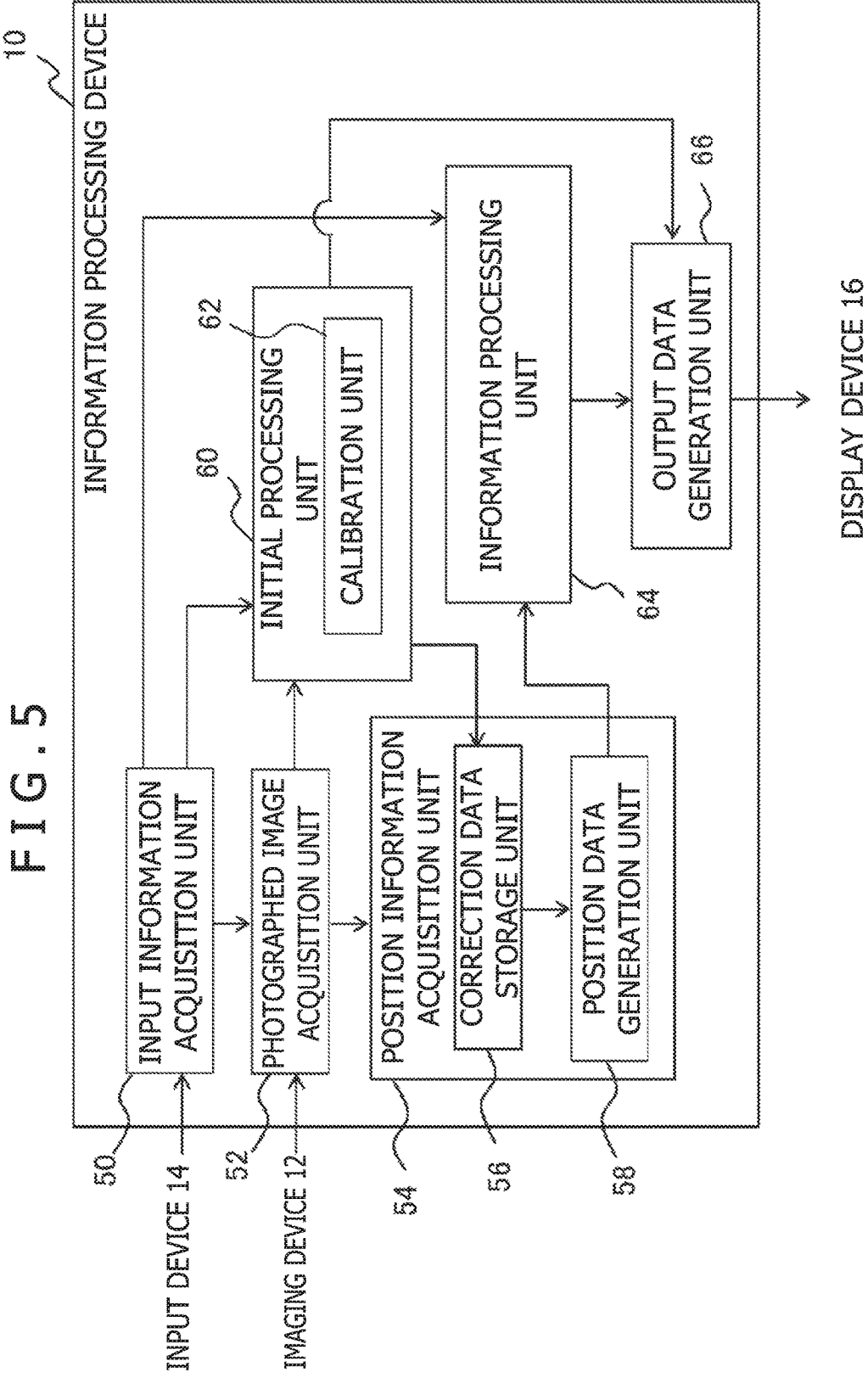
FIG. 5 is a diagram illustrating a functional block configuration of the information processing device in the present embodiment.

FIG. 5 illustrates a functional block configuration of the information processing device 10. As hardware, each functional block illustrated in FIG. 5 can be realized by using the configuration of the CPU, GPU, main memory, and the like illustrated in FIG. 2; further, as software, it can be realized by programs for exerting many functions such as a data input function, data retention function, image processing function, and input/output function loaded from recording mediums or the like into memory. Accordingly, it is understood by those skilled in the art that these functional blocks can be realized in various shapes by using only hardware, only software, or in combination thereof, and are not limited to any one thereof.

The information processing device 10 includes an input information acquisition unit 50 that acquires input information from the input device 14, a photographed image acquisition unit 52 that acquires data on the photographed image from the imaging device 12, a position information acquisition unit 54 that acquires position information on the object, an initial processing unit 60 that performs initial processing such as a connection confirmation, user registration, or various calibrations, an information processing unit 64 that performs information processing by using the position information, and an output data generation unit 66 that generates output data such as a display image. The input information acquisition unit 50 acquires contents of the user operation from the input device 14. Herein, the user operation may be performed in the general information processing such as a selection of applications to be performed, start/end of processing, or command input. The input information acquisition unit 50 supplies the information acquired from the input device 14 to the photographed image acquisition unit 52, the initial processing unit 60, or the information processing unit 64 in accordance with the contents.

The photographed image acquisition unit 52 acquires, at a prescribed frame rate, data on the photographed image obtained by photographing a moving picture by the imaging device 12. The photographed image acquisition unit 52 may further control a start/end of the photographing in the imaging device 12 in accordance with a processing start/end requirement from the user acquired by the input information acquisition unit 50, or control a type of data acquired from the imaging device 12 in accordance with results of the processing in the information processing unit 64.

The position information acquisition unit 54 specifies a position or movement in the real space on the basis of a position of the image of the object included in the photographed image. In detail, the position information acquisition unit 54 includes a correction data storage unit 56 and a position data generation unit 58. The correction data storage unit 56 stores various parameters obtained by the calibration and used to acquire the position information, such as a positional deviation value in the longitudinal direction of the stereo images. The position data generation unit 58 acquires data on the stereo images of each frame obtained by photographing moving pictures from the photographed image acquisition unit 52, and detects the corresponding points in both the images.

At this time, the position data generation unit 58 first refers to the positional deviation value stored in the correction data storage unit 56 and shifts either image in the longitudinal direction on the image plane to align positions of the images of the left and right as described above. For each reference block set in one image, the position data generation unit 58 then calculates a degree of similarity or the like and determines the corresponding block while moving a search window on a line corresponding to the other image. On the basis of the difference of the positions in the lateral direction between the reference block and a block corresponding to the reference block, the position data generation unit 58 further specifies a distance from the camera of the object reflected therein by the principle of the triangulation. The position data generation unit 58 further generates a depth image in which distances from the cameras are mapped to the image plane as a pixel value or the like to generate final position data and supplies the final position data to the information processing unit 64.

The initial processing unit 60 presents prescribed information necessary to start the information processing to the user, or persuades the connection confirmation or various setting input to the user to manage results thereof. As the timing at which the initial processing unit 60 performs such processing, for example, it is considered that a time at which a power supply is first put in the information processing device 10 or a time at which an individual user performs a login registration. An information presentation or setting input to be performed at such timing may be similar to that to be performed in general information processing devices. In the present embodiment, the calibration unit 62 is installed in the initial processing unit 60, and the above-described prescribed initial processing and the calibration of the imaging device 12 are performed at the same time.

The calibration unit 62 basically acquires the positional deviation value in the longitudinal direction of the stereo images and stores results thereof in the correction data storage unit 56 of the position information acquisition unit 54. Note, however, that an initial value of the positional deviation value may be stored in a stage for shipping the imaging device 12 or the information processing device 10 and the initial value may be updated, if necessary. For each login registration, when the calibration is performed, the positional deviation value acquired at the time when the previous user performs the registration may be updated, if necessary. In the calibration, as described above, a block having a high degree of similarity with the reference block set in one stereo image is detected by the searching in an area in the relatively wide range of the other image and the deviation is acquired from a positional relationship in the longitudinal direction.

At this time, on the basis of a photographing environment at this time point, a variation from the previously acquired positional deviation value, or the like, it is determined whether or not it is necessary for the user to perform some sort of measures for the calibration; further, even if it is necessary to perform the measures, a level of the burden or the like is different. To solve the above-described problem, the calibration unit 62 first determines whether or not it is necessary for the user to perform some sort of measures and, if it is not necessary to perform the measures, completes, as it is, the calibration in parallel with other processing performed by the initial processing unit 60, and stores the acquired positional deviation value in the correction data storage unit 56.

Whether or not it is necessary for the user to perform some sort of measures may be determined on the basis of a real positional deviation value obtained by performing the calibration, or other determination standards may be used. For example, in the case that there is an obvious abnormality in the direction of the camera, when the user recognizes that effect, the measures can be easily performed and therefore a waste of performing the calibration can be omitted without considering such a situation. Thus, the calibration unit 62 may have a function other than the calibration, of determining whether or not it is necessary for the user to perform the measures for the calibration. For example, the calibration unit 62 appropriately includes a function of acquiring an attitude of the imaging device from a sensor value of an acceleration sensor housed by the imaging device 12, a function of detecting a face from the photographed image, a function of acquiring a luminance distribution or frequency characteristics of the photographed image, or the like. Alternatively, the depth image may be generated by using the position information acquisition unit 54, and whether or not it is necessary for the user to perform the measures may be determined on the basis of the results.

At any rate, when the calibration can be completed without performing some sort of measures by the user, the user can end the initial processing without becoming aware of the performed calibration itself and start desired information processing. On the one hand, when the user needs to perform some sort of measures, the calibration unit 62 presents the information in the order corresponding to the information in which the measures having a low level of the burden is performed and, whenever the measures are performed, tries the calibration. Then, when the calibration is successful, the calibration unit 62 stores the obtained value of the positional deviation in the correction data storage unit 56 and then ends the processing.

Through this processing, the information processing can be started with a minimum burden according to an individual situation such as the photographing environment. In addition, in some cases, the calibration may be performed at the timing other than the above-described so-called "initial processing." At any rate, the calibration is performed in parallel with some sort of processing, and thereby the situation is realized in which the user does not become aware of the calibration as far as possible and the calibration has been completed.

The information processing unit 64 performs the information processing such as a game specified by the user. On this occasion, the position information on the object is acquired for each frame from the position data generation unit 58, and thereby a position or movement of the object is reflected on the information processing. The information processing unit 64 may further reflect contents of the user operation acquired by the input information acquisition unit 50 from the input device 14. As described above, contents of the information processing performed by the information processing unit 64 by using these input data are not particularly limited.

The output data generation unit 66 generates data on an image or voices to be output as results of the information processing in accordance with a request from the information processing unit 64. As described above, for example, the output data generation unit 66 draws, as the parallax images of the left and right, a virtual world viewed from the view points corresponding to the position or attitude of the head of the user. When the parallax images are displayed in front of eyes of the left and right or voices in the virtual world are output in the HMD 16b, the user obtains a sense as if entering into the virtual world. In addition, it is understood by those skilled in the art that the various information processing can be realized by using the position information on the object or the user operation.

The output data generation unit 66 further generates data on the image or voices for indicating information necessary for the initial processing or receiving the setting of the information in accordance with requests from the initial processing unit 60. When it is determined that the user needs to be allowed to perform some sort of measures for the calibration, the output data generation unit 66 receives a request to the effect from the calibration unit 62 and generates also the data on the display image or voices according to the request. The generated output data is appropriately output to the flat display 16a or the HMD 16b, and thereby is output as the image or voices.

Figure 6:
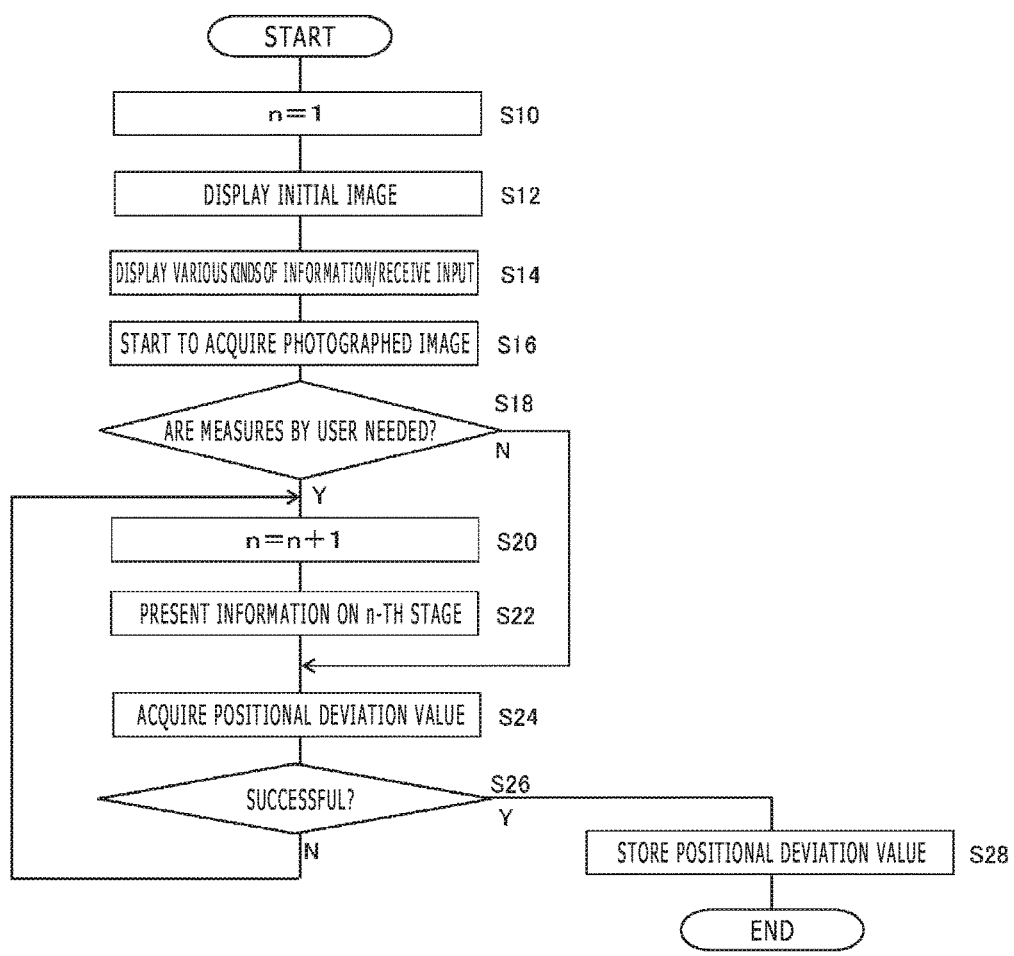
FIG. 6 is a flowchart illustrating a processing procedure in which the information processing device performs calibration along with necessary initial processing in the present embodiment.

Subsequently, operations of the information processing device 10 realized by the above-described configuration will be described. FIG. 6 is a flowchart illustrating a processing procedure in which the information processing device 10 according to the present embodiment performs the calibration along with the necessary initial processing. This flowchart is started at the time when the user first starts up the information processing device 10 or the like. As described above, in the present embodiment, the information is further presented in the order of the information on lower burden on the user and thereby the calibration is advanced stepwise. In the same flowchart, the stage number at each time point is indicated by an integer n in ascending order and a value of n at the time point of starting the flowchart is set to 1 (S10).

When the user appropriately connects the information processing device 10, the input device 14, the display device 16, the imaging device 12, and the like to each other and starts up the information processing device 10, the initial processing unit 60 allows the display device 16 to display a prescribed initial image via the output data generation unit 66 (S12). This initial image may generally include a character string indicating that the information processing device 10 is normally started up, such as a logo of the device or "Welcome." Subsequently, the initial processing unit 60 allows the display device 16 to display a screen for receiving various initial setting or a screen for displaying a license agreement and appropriately receives an input from the user (S14). At this time, the initial processing unit 60 confirms a connection state of various devices and, when the connection is not appropriate, notifies the user of that effect.

After confirming that the imaging device 12 is connected, the initial processing unit 60 allows the imaging device 12 to start the photographing via the photographed image acquisition unit 52 and the photographed image acquisition unit 52 acquires data on the stereo images photographed in accordance with the start (S16). Then, as part of the processing in a first stage, the calibration unit 62 first determines whether or not some sort of measures are needed by the user (S18). That is, as described above, in addition to a case in which a direction of the camera is not appropriate, when the situation inappropriate for the calibration is obvious, such as there is an obstacle in front of an imaging surface, illuminance is short, or there is no object in which an appropriate feature point is obtained in the field of view, those situations are detected in advance, and thereby the calibration having a high burden of the processing is not performed vainly.

Specifically, in the following case, it is determined that the measures are needed.

1. As a result of face detection processing, a face is not detected.
2. A feature point of a prescribed amount or more is not detected.
3. Luminance distributions or frequency characteristics are not in an appropriate range.
4. A depth image generated by using the positional deviation value acquired in the past does not indicate a normal value.
5. A measured value of an acceleration sensor or the like indicates that an attitude of the imaging device 12 is not appropriate.

The above-mentioned conditions are consistently illustrative and, when the situation can be detected in which the calibration can be performed appropriately, the method or means to be used is not limited. Further, one of such conditions may be adopted or a plurality of conditions may be adopted in combination thereof. Further, the above-mentioned conditions are described in sentences; however, in practice, each of the situations is digitized and the determination standard corresponding to the situations is set individually. If it is determined that the above-mentioned conditions are not satisfied and the calibration can be performed without the measures by the user (N in S18), the calibration unit 62 performs the calibration by using the stereo images obtained at that time point and acquires the positional deviation value in the longitudinal direction (S24).

Then, if the calibration is successful such as the acquired positional deviation value is present in a normal range (Y in S26), the value is stored in the correction data storage unit 56 and the initial processing is ended (S28). In addition, the processes according to the calibration in S16, S18, S24, and S26 at this time can be performed in a so-called background in parallel with the information display in S14 or various input reception processing. Therefore, when the calibration is successful in the first stage, the user can end a procedure necessary for an initial stage without knowing that operations of the calibration unit 62 are performed.

If the situation is matched with the above-mentioned conditions in S18 and it is determined that the measures by the user are needed (Y in S18), the calibration unit 62 advances the stage by one without performing the calibration in the first stage (S20). Even if the calibration is unsuccessful in S26, the calibration unit 62 advances the stage by one (N in S26 and S20). In this stage, it is confirmed whether or not the calibration is made successful by improving the situation of the minimum burden by the user. Specifically, the display device 16 is allowed to display the image photographed by the imaging device 12 as it is (S22).

In a class of the situation such as the direction of the camera is not appropriate or an obstacle is present in front of the imaging surface, when viewing the photographed image, problems can be grasped plainly and easily solved. Thus, as the second stage, the photographed image is instantly displayed in S22 and the user is persuaded to intuitively grasp problems. Alternatively, while the photographed image is viewed, a simple and operable instruction or guideline may be given to the user by the character string or the like. In accordance with the above, when detecting that the user performs some sort of measures, the calibration unit 62 performs the calibration by using the stereo images obtained at that time point and acquires the positional deviation value in the longitudinal direction (S24).

Then, if the calibration is successful such as the acquired positional deviation value is present in the normal range (Y in S26), the value is stored in the correction data storage unit 56 and the initial processing is ended (S28). Through this processing, the user burden for the calibration is a simple work such as the direction of the camera is corrected or an obstacle is removed. On the one hand, even if such a thing is performed, if the calibration is unsuccessful (N in S26), the stage is further advanced by one (S20) and information on the third stage for the calibration is presented (S22).

Herein, the presented information is somewhat more complicated than the information presented in the second stage or requests the measures of high burden and includes instructions for the user, such as illumination is made bright or the user stands at a prescribed position with an object in which the feature point is easily identified. When detecting that the user obeys the instruction, the calibration unit 62 performs the calibration by using the stereo images obtained at that time point and acquires the positional deviation value in the longitudinal direction (S24).

Then, if the calibration is successful such as the acquired positional deviation value is present in the normal range (Y in S26), the value is stored in the correction data storage unit 56 and the initial processing is ended (S28). Even when the above is performed, if the calibration is unsuccessful (N in S26), the stage is further advanced by one (S20) and processing of requesting the measures of a higher burden and trying the calibration (S22, S24, and S26) is repeated until the calibration is successful. Note, however, that a result that the calibration is unsuccessful may be output in a prescribed stage number and the process may be exited.

As described above, a level of the burden by the user and the information to be presented are associated with each other, the information is presented in the order of low burden, and the calibration is tried in each case; thereby, the calibration is completed in the minimum burden according to an individual situation of the user. The calibration unit 62 internally holds data in which the stage number n and the information to be displayed are associated with each other and presents the corresponding information each time the stage of the processing of the calibration is advanced. In addition, in the above-mentioned descriptions, the photographed image is instantly displayed as the second stage and the image including the instructions is displayed in the third stage; however, the present embodiment is not the gist limited to the above-described example. For example, the information to be presented may be further broken into parts and the stage may be separated minutely, or the information to be presented may be diversified in combination of an instant display and instruction display of the photographed image.

Subsequently, an example of the screen displayed during the initial processing in the present embodiment is illustrated. FIG. 7 illustrates an example of the screen displayed in S12 and S14 of FIG. 6. The screen of FIG. 7(a) includes the character string of "start a setup" for notifying the user that the initial processing is started from now and a guidance display of an input button or a GUI (Graphic User Interface) for selecting accepting the above or returning to a previous screen. Herein, when the user accepts a start-up of the initial processing, such as a "o" button indicating "determination" of the input device 14 is depressed, the initial processing unit 60 starts the prescribed initial processing.

As a result of checking whether or not various devices are appropriately connected to each other as part of the initial processing, for example, when the imaging device 12 is not connected, the connection is persuaded to the user while indicating the character string such as "connect the camera" or figures as in the screen of FIG. 7(b). The same screen further displays a guidance of the input button or the GUI for selecting inputting the effect that the user completes works or returning to the previous screen. When the connection of the imaging device 12 is completed, the user depresses the "o" button indicating the "determination" and thereby the initial processing unit 60 detects that effect, confirms the connection again, and starts other initial processing.

When each device is appropriately connected to each other from the beginning, the screen of (b) is not displayed. At any rate, when a state in which the imaging device 12 is connected can be confirmed, the calibration unit 62 performs the first stage of the calibration. As described above, since the measures by the user are not needed in the first stage, the license agreement may be displayed in parallel with the first stage or various setting input may be received. Alternatively, the character string of "wait for a while" may be displayed and it may be clearly specified that some sort of calibration processing is performed. When the calibration is successful in this stage, the calibration unit 62 ends the operation.

Figure 8:
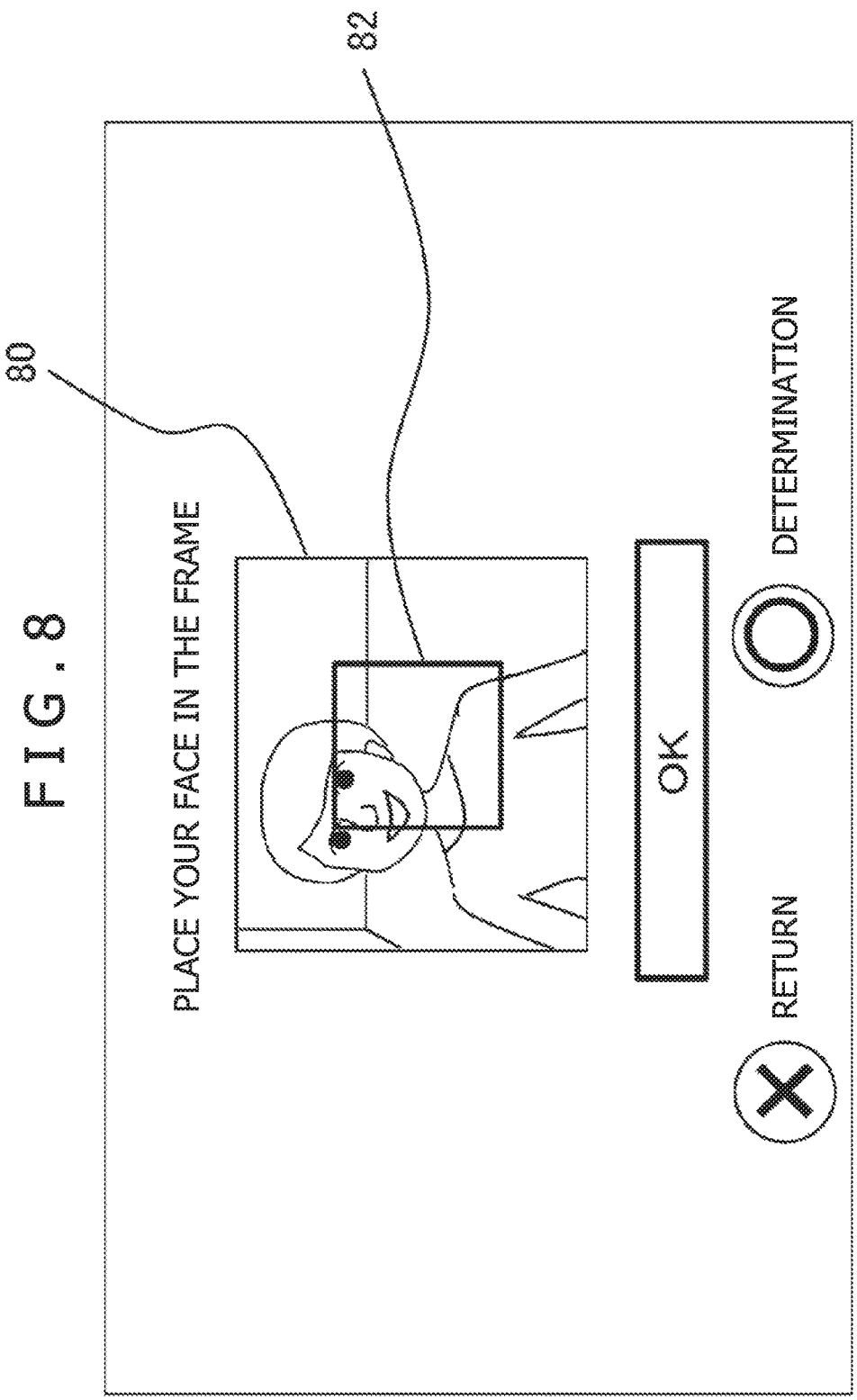
FIG. 8 is a diagram illustrating an example of the screen displayed in S22 of FIG. 6 as processing in a second stage in the present embodiment.

When the measures by the user detect a necessary situation before the calibration or when the calibration is unsuccessful, the calibration unit 62 moves to the second stage of the calibration. FIG. 8 illustrates an example of the screen displayed in S22 of FIG. 6 as the processing of the second stage. In this example, there are displayed an image display area 80 in which one image of the stereo images is instantly displayed and a frame 82 in which a prescribed area such as a central portion in that area is represented. Also, an instruction to the user such as "place a face in a frame" is displayed in the character string. Further, there is displayed the guidance of the input button or GUI for selecting inputting that the user obeys the instruction or returning to the previous screen.

When a position or attitude such that his/her own face is placed in the frame 82 is taken, the user depresses the "o" button indicating the "determination," and thereby the calibration unit 62 detects that effect and starts the calibration. When the calibration is successful in this stage, the calibration unit 62 ends the operation. The photographed image is instantly displayed in this manner and the calibration is performed by using the image such that "a person's face" having obvious feature points is definitely placed in the prescribed area; thereby, the probability in which the calibration is successful can be enhanced.

Figure 9:
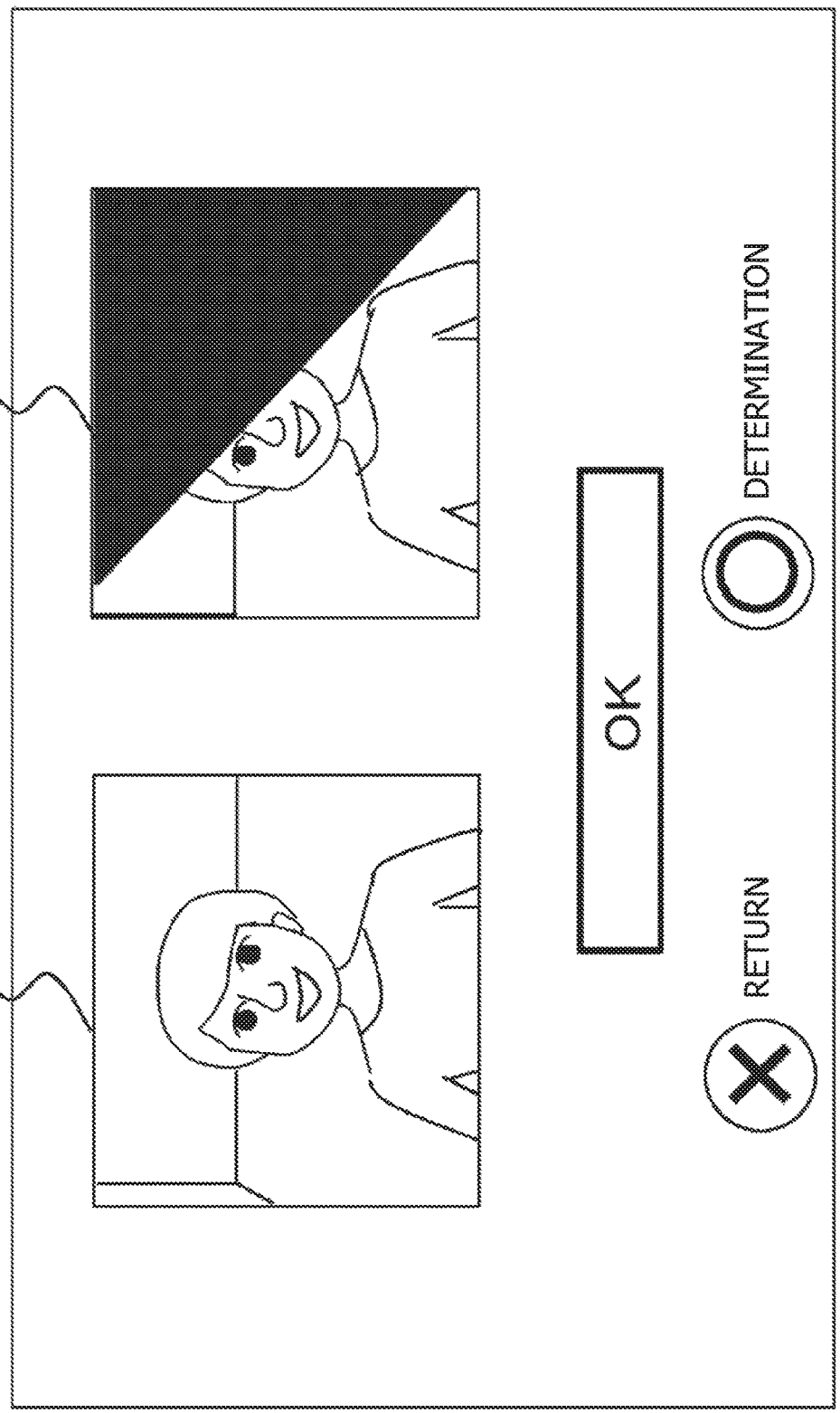
FIG. 9 is a diagram illustrating another example of the screen displayed in S22 of FIG. 6 as the processing in the second stage in the present embodiment.

On the one hand, in the second stage, for the purpose of excluding problems that are more simply solvable in a lower burden such as an obstacle in front of the camera is removed, the photographed image is considered to be instantly displayed only. FIG. 9 illustrates another example of the screen displayed in S22 of FIG. 6 as processing in the second stage. In this example, there are displayed image display areas 84a and 84b in which both of the stereo images are instantly displayed. As illustrated in figures, it can be comprehended at a glance that part of the photographed image displayed in one image display area 84b is hidden and some sort of obstacle is present such as a cloth hangs on an imaging surface of the corresponding camera. In this case, the user takes away the cloth or the like and depresses the "o" button indicating the "determination," and thereby the calibration unit 62 detects that effect and starts the calibration.

Figure 10:
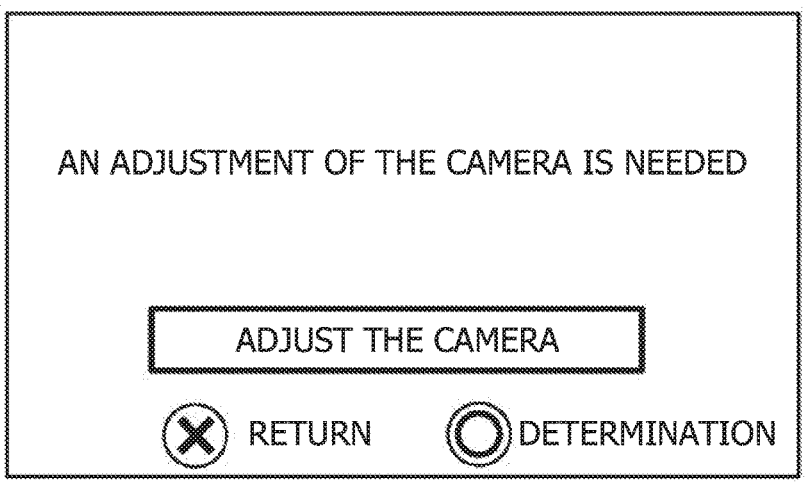
FIG. 10 is a diagram illustrating an example of the screen displayed in S22 of FIG. 6 as the processing in a third stage in the present embodiment.

When the calibration is not successful even in the second stage, the calibration unit 62 moves to a third stage of the calibration. FIG. 10 illustrates an example of the screen displayed in S22 of FIG. 6 as the processing in the third stage. Note, however, that in this example, a screen displayed first in the third stage is assumed, and subsequently there are displayed the character string of "an adjustment of the camera is needed" for notifying the user that the calibration needs to be fully performed and the GUI or the like for selecting whether or not the character string is accepted. Herein, when the user depresses the "o" button indicating the "determination" or the like and inputs an intention of the acceptance, the calibration unit 62 moves to information presentation (not illustrated) for the measures set as the third stage and a routine in which the calibration corresponding to the image photographed after the measures is performed.

In this example, the third stage is assumed to be a final stage of calibration operations. Therefore, the information to be presented is basically a class of giving detailed instructions to a standing position or gripping object of the user. From among such instructions, an instruction of lower burden on the user may be presented previously. Alternatively, on the basis of results of the calibration, image analysis results, or the like, the instruction to be presented may be selected. When the calibration is successful in any stage of the first stage to the third stage and the other initial processing is also completed, the initial processing unit 60 displays, for example, the character string of "the setup has ended" or the like, and notifies the user of a completion of the initial processing and ends the processing. This processing permits the user to display a menu screen or the like separately and start desired information processing such as a game.

In the present embodiment, the possibility that the calibration is completed becomes high while the user does not become aware of the completion of the calibration; therefore, whenever performing the login registration, a new user may perform the calibration at the background in parallel with the display of necessary information at the time of registering a license agreement and the like. In this case, when the positional deviation value acquired at the time of registering the login by the user does not change first, the value is maintained and, when the positional deviation value changes, the value stored in the correction data storage unit 56 is updated. As a result, as the number of the users that register the login is more increased, the accuracy of the positional deviation value used in the operation may be more improved.

Further, in the system that performs face authentication at the time of the login, the feature amount of the face for the authentication is acquired at the time of registering the login. By using the feature amount of the face, right and wrong of the implementation of the calibration or a method for advancing the stage of the calibration may be changed on the basis of the face reflected in the photographed image. For example, even when a new user performs the login registration, in a case in which also the face of the user that performed the login registration in the past is reflected all together, the calibration is omitted or only the calibration in the first stage is performed in the range in which the information presentation to the user is not performed because of the high accuracy of the already acquired positional deviation value. In the latter case, when the calibration is successful and the positional deviation value changes from the previously acquired positional deviation value, the positional deviation value may be updated and, when the calibration is unsuccessful, the previously acquired positional deviation value may be adopted as it is.

On the contrary, when the face of the previously registered user is not reflected, since the environment or situation may be changed, the calibration in the first stage may be omitted and the calibration may be performed from the calibration in the second stage or the third stage. As described above, a temporal change of the situation is added, and then right and wrong of simplification of the calibration can be appropriately determined. Also, other than the feature amount of the face, a change in the environment or situation may be detected on the basis of a space structure of furniture or the like in the field of view of the camera.

In accordance with the above-described present embodiment, in the information processing technology for acquiring the position information of the object by using the stereo images, the camera calibration that is conventionally performed by preparing an appropriate photographing environment is performed stepwise in comparison with the need according to the real situation. Specifically, when the situation is that the measures are not particularly needed and the appropriate photographing environment is obtained, the calibration is performed by using the photographed image at that time. In this case, since the notification to the user is not needed, the processing is performed in parallel with another processing and thereby the processing is completed without becoming aware of the processing by the user.

As the next stage at the time when the calibration is unsuccessful when maintaining the current situation, the photographed image is instantly displayed. Through this processing, when the problems that can be solved relatively easily have caused an unsuccess, such as the direction of the camera is not appropriate or an obstacle is present in front of the imaging surface, the user is allowed to grasp the problem at a glance and the calibration can be led to a success through the low burden. Even if doing so, when the calibration is not successful, the instruction is given to the user and the appropriate photographing environment is created positively, and thereby the calibration is performed definitely.

Further, before the calibration of a high burden is practically performed, on the basis of a standpoint other than the result of the calibration, such as face detection results or a measured value by an internal sensor, it is determined whether or not the calibration is performed and it is determined that when the calibration is performed, in which stage the calibration is performed. Through this processing, various events such as an individual environment or a change in the situation can be added and the calibration can be performed more efficiently. Through this processing, botheration of the setting that is easy to cause at the time when the device is used for the first time can be reduced as far as possible and a mental barrier for the use of a new device can be reduced. Consequently, as a result of starting to use the device without performing sufficient calibration, deteriorated user experiences are prevented from being generated.

As described above, the present invention is described on the basis of the embodiment. The above-mentioned embodiment will be illustrative and it is understood by those skilled in the art that various modification examples can be made in combination of each configuration elements or each processing process thereof and such modification examples are present in the range of the present invention.

REFERENCE SIGNS LIST

8 Information processing system, 10 Information processing device, 12 Imaging device, 14 Input device, 16a Flat display, 16b HMD, 16 Display device, 50 Input information acquisition unit, 52 Photographed image acquisition unit, 54 Position information acquisition unit, 56 Correction data storage unit, 58 Position data generation unit, 60 Initial processing unit, 62 Calibration unit, 64 Information processing unit, 66 Output data generation unit

INDUSTRIAL APPLICABILITY

As described above, the present invention can be used in a game device, an image processing device, an information processing device, an object recognition device, an image analysis device, a system including any of them, or the like.

The invention claimed is:

1. An information processing device that acquires position information on an object from an image photographed by a stereo camera and performs information processing, comprising:
   a calibration unit configured to detect corresponding points from stereo images photographed from view points of left and right by the stereo camera and thereby perform calibration of the stereo camera; and
   a position information acquisition unit configured to correct the stereo images obtained by photographing a moving picture of the object by the stereo camera and further detect the corresponding points to thereby derive a parallax on the basis of a result of the calibration, and acquire and output the position information on the object on the basis of the parallax,
   wherein the calibration unit repeats stepwise processing for presenting prescribed information and retrying the calibration in the order that is set on the basis of a low burden on a user in accordance with an unsuccess of the calibration and ends an operation in a stage in which the calibration is successful.

2. The information processing device according to claim 1, further comprising:
   an initial processing unit configured to perform initial processing other than the calibration, wherein
   the calibration unit tries first calibration without presenting information on the calibration while the initial processing unit presents information for the initial processing.

3. The information processing device according to claim 1, wherein
   the calibration unit allows a display device to instantly display at least either of the stereo images photographed by the stereo camera as the prescribed information in any stage.

4. The information processing device according to claim 1, wherein the calibration unit determines by means other than the calibration whether a processing start is right or wrong in the first calibration and, when determining that the processing start is right, does not present information on the calibration but tries the calibration and, when determining that the processing start is wrong, presents the prescribed information set as a next stage and tries the calibration.

5. The information processing device according to claim 4, wherein the calibration unit acquires an attitude of the stereo camera from a measured value of an acceleration sensor installed within the stereo camera and, when the attitude is present in a prescribed range, determines that the processing start of the calibration is right.

6. The information processing device according to claim 4, wherein the calibration unit subjects the stereo images to face detection processing and, when a face is detected, determines that the processing start of the calibration is right.

7. The information processing device according to claim 4, wherein the calibration unit subjects the stereo images to face recognition processing and, when a registered face is not detected, determines that the processing start of the calibration is wrong.

8. The information processing device according to claim 4, wherein the calibration unit allows the position information acquisition unit to acquire the position information on the basis of the result of the calibration performed previously and, when a normal position information is not obtained, determines that the processing start of the calibration is wrong.

9. The information processing device according to claim 1, wherein the calibration unit presents an instruction to the user for taking measures assumed to be necessary as the prescribed information in a final stage.

10. A position information acquisition method performed by an information processing device that acquires position information on an object from an image photographed by a stereo camera and performs information processing, comprising:
    detecting corresponding points from stereo images photographed from view points of left and right by the stereo camera and thereby performing calibration of the stereo camera; and
    correcting the stereo images obtained by photographing a moving picture of the object by the stereo camera and further detecting the corresponding points to thereby derive a parallax on the basis of a result of the calibration, and acquiring and outputting the position information on the object on the basis of the parallax,
    wherein the performing the calibration repeats stepwise processing for presenting prescribed information and retrying the calibration in the order that is set on the basis of a low burden on a user in accordance with an unsuccess of the calibration and ends an operation in a stage in which the calibration is successful.

11. A non-transitory, computer readable storage medium containing a computer program, which when executed by a computer that acquires position information on an object from an image photographed by a stereo camera and performs information processing, causes the computer to carry out actions, comprising:

detecting corresponding points from stereo images photographed from view points of left and right by the stereo camera and thereby performing calibration of the stereo camera; and correcting the stereo images obtained by photographing a moving picture of the object by the stereo camera and further detecting the corresponding points to thereby derive a parallax on the basis of a result of the calibration, and acquiring and outputting the position information on the object on the basis of the parallax, wherein performing the calibration repeats stepwise processing for presenting prescribed information and retrying the calibration in the order that is set on the basis of a low burden on a user in accordance with an unsuccess of the calibration and ends an operation in a stage in which the calibration is successful.

* * * * *